Sept. 7, 1943.　　　G. P. PEED, JR　　　2,329,133
AIRCRAFT CONSTRUCTION
Filed April 9, 1941
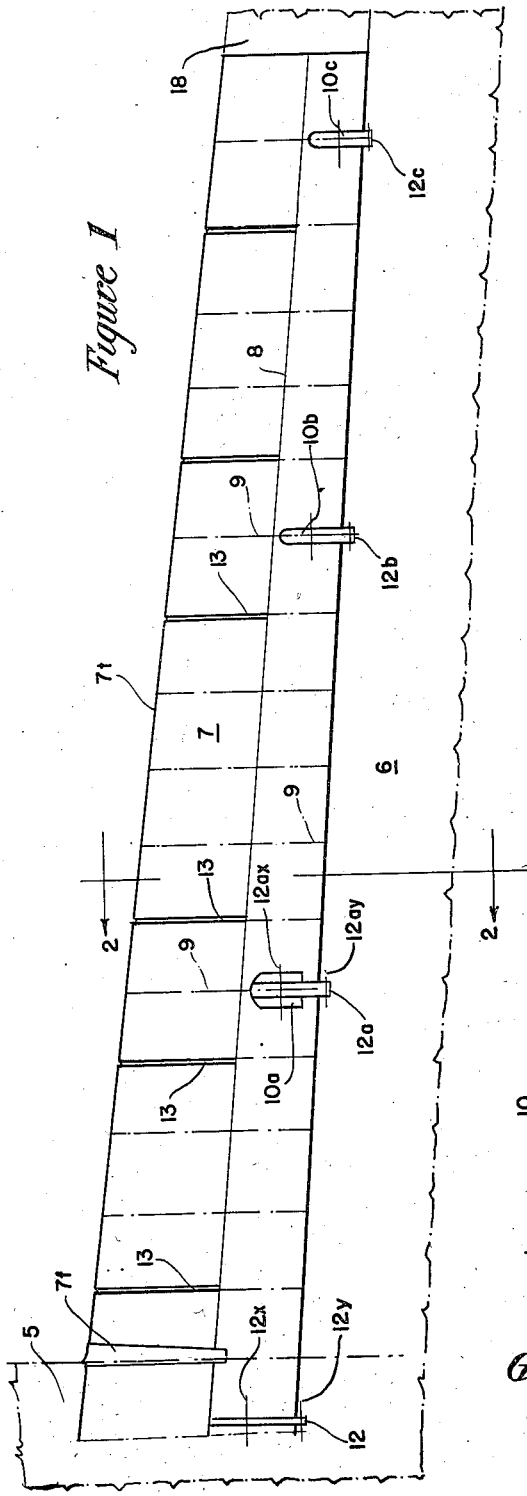
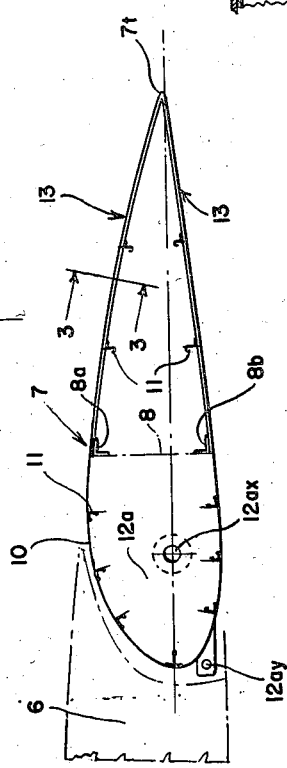
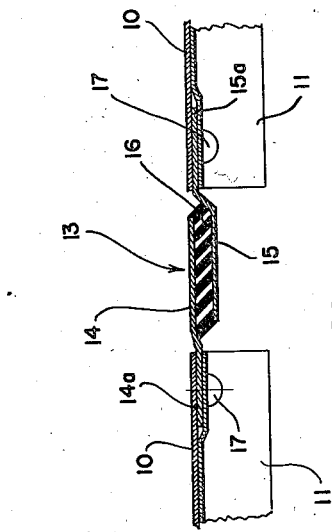
Garland P. Peed Jr. INVENTOR.
BY James M. Clark.
His Patent Attorney Patented Sept. 7, 1943

2,329,133

UNITED STATES PATENT OFFICE 2,329,133

AIRCRAFT CONSTRUCTION

Garland P. Peed, Jr., Pacific Palisades, Calif., assignor to Douglas Aircraft Company, Inc., a corporation of Delaware Application April 9, 1941, Serial No. 387,554

9 Claims. (Cl. 244—42)

The present invention relates to aircraft construction and more particularly to the means and methods of fabrication of aircraft structures such that forces and stresses imposed in one portion of a structure are isolated from another portion of the same structure.

Aircraft structures, particularly the sustaining surfaces of large airplanes of metal construction, are bent or deflected to appreciable extents when subjected to higher wing loadings per unit of area. Among the causes which contribute to appreciable bending or other strain in the wing and tail structures are forces resulting from various flight attitudes, the action of gusts in turbulent air, the change in loading due to release of military or other loads or to fuel consumption during a long flight, as well as a number of other factors. The deformation of the wings of aircraft due to these load conditions is greater than other portions of the airplane structure due to their relatively large span as a cantilever beam with respect to their effective depth.

The deflection of wing surfaces is of such magnitude in certain aircraft under these conditions that the hinged surfaces such as ailerons, flaps and elevators bind and are operated only with difficulty. This condition is due to the twisting or distortion of the hinging axis or the several axes by which the movable surface is operatively connected to the wing structure. These and other difficulties have been overcome by the present invention which comprises essentially the insertion of a plurality of strips of elastic substance at spaced intervals throughout the span of the flap, the strips running chordwise of the surface. Where these flexible strips are inserted the metal frame and skin covering of the movable surface are preferably interrupted at intervals measured spanwise of the surface and are bonded to the opposite sides of the strip. The invention also contemplates the provision of such shear strips of standardized cross sections as a new article of manufacture which may be furnished in relatively long lengths and bent and cut to length to suit a particular installation.

It is accordingly a primary object of the present invention to provide a method of fabricating aircraft structures such that stresses imposed in one part of the structure may be effectively isolated from the other parts. It is also an object to provide a flap, or other movable surface, construction which will at all times be freely operable despite the bending of the wing and distortion of the hinge line of the flap. It is also an object of the present invention to provide a movable surface comprising a plurality of elastically interconnected portions which are free to bend or fan out to adapt themselves to the bending of the sustaining surface to which they are connected and to the hinge lines of these connections.

Other objects and advantages of the present invention will occur to those skilled in the art after a reading of this specification and the accompany drawing forming a part hereof, in which:

Fig. 1 is a plan view of a trailing edge flap embodying this invention showing adjacent portions of the wing and fuselage;

Fig. 2 is an enlarged cross sectional view of the flap taken along the lines 2—2 of Fig. 1; and Fig. 3 is an enlarged cross section of a stress isolation unit as taken along the lines 3—3 of Fig. 2.

Referring now to Fig. 1, there is shown a portion of the aircraft fuselage 5, from which extends laterally the main sustaining surface or wing 6 of which only the inner trailing portion is shown. The trailing edge of the wing has fitted thereto a flap or other high lift landing device 7, which preferably extends from the region of the fuselage 5 and the fairing 7f out to the ailerons 18. While the present invention was developed for use primarily in wing flaps and similar high lift landing devices, it is also capable of use under certain conditions in connection with ailerons, elevators and other movable surfaces.

The flap 7 comprises essentially a spanwise spar 8 which may preferably consist of a web plate and angle flange members 8a forming the upper and lower chords of the spar; rib elements 9 which extend chordwise of the flap from its leading edge to the trailing edge 7t and serve to form and support its outer skin covering 10 in the desired airfoil shape The flap construction also preferably includes a plurality of spanwise longitudinals 11 which may or may not be interrupted within the forward portion of the flap by the hinge mounting fitting 12. The hinge fittings 12 each provide two spaced pivot axes 12X and 12Y by means of which the flap is suitably supported by operating mechanism, not shown, from the wing structure and by which it may be operated by the pilot to be projected, or pivotally rotated, into positions either downwardly or rearwardly, or both, with respect to the main wing 6 in order to provide greater lift and increased drag for braking effects during landing and other operations. Any suitable flap operating mechanism, which does not form an essential part of the present invention, might be utilized with the flaps comprising this construction, suitable openings 10a, 10b and 10c being provided in the wing surfaces for this purpose.

Adjacent the hinge fittings 12, 12a, 12b and 12c and on each side thereof rearwardly of the spar 8 the ribs 9 are preferably replaced by the stress isolation or shear units 13. These units consist essentially of two offset or crimped sheets 14 and 15 between which is bonded or vulcanized a strip of rubber, neoprene, Thiokol or other elastic material 16 as more clearly shown in Fig. 3. The metal strips 14 and 15 are of such width that they include laterally extending ear portions 14a and 15a which permit them to be fastened, as by the rivets 17, to the skin 10 and the longitudinal elements 11, both of which are interrupted spanwise of the wing in order not to impair the flexibility of the units 13 which assume the shear stresses across the intervening spaces. As shown in Fig. 3 the outer metallic strip 14 of the stress isolation unit 13 is offset or joggled inwardly toward its attachment at 14a approximately the thickness of the skin 10 such that the outer surfaces of the skin 10 and the riveting strip 14 are substantially flush. Similarly the inner sheet 15 bonded to the other side of the elastic strip 16 is bent or offset in an outward direction to an extent to compensate for the thickness of the strip 16. Accordingly, when they are attached to the skin 10 and the elements 11 which are also bent or offset slightly, the outer surface of the skin is substantially flush with the outer surface of the metallic strip 14, and presents a smooth surface to the airstream.

If it now be assumed that the wing 6 is subjected to bending by any of the above enumerated or other causes it will be seen that the relative movements of one portion of the flap structure with respect to the other results in relative telescoping of the plates 14 and 15 which is resiliently opposed by the resistance to shear of the rubber-like strip 16. The elastic units 13 become in effect laterally compressible ribs which maintain the airfoil profile and permit the flap to "fan out" and more or less cooperate with the distortion of the hinge lines 12x, 12y, 12ax, 12ay, etc., each of which are distorted by the bending of the main wing.

It will be obvious to those skilled in the art that various modifications of the herein disclosed construction will be possible, but all are intended to fall within the scope and spirit of this invention. For example, the elastic strips 16 may be bonded directly between overlapping spaced edges of the metallic skin or other portions of the structure within which the strips are intended to be built. The shear rib or laterally flexible former units 13 have been shown applied to a flap trailing portion of monocoque construction but it is not necessarily limited thereto as it is equally applied in semi-monocoque and internally braced structures which are built to permit flexing or prevent transmission of stresses. While the stress isolation units 13 have been found entirely satisfactory in the construction shown, in other structures it might be found desirable that they be extended forward of the spar 8, or approximate center of pressure of the airfoil section, namely along the entire chordwise outline or profile of the surface. The figures of the modification shown in the drawing, have been selected primarily for purposes of explaining the present invention, and may be modified considerably without departing from the essence of this invention. All other such modifications and forms, both with respect to general arrangement and detail design, are intended to fall within the scope and spirit of the present invention as more clearly defined by the appended claims.

I claim:
1. In aircraft constuction the combination of a cantilever wing subject to deflection under load and a movable sectional flap pivotally mounted on said wing for relative movement thereto, and said sectional flap having its trailing portions resiliently interconnected by chordwise elastic strips lying substantially in the plane of the upper and lower surfaces of said flap whereby said flap remains freely pivotable in all said deflected conditions of said wing and its pivotal mountings.

2. An aircraft surface including in combination a spar dividing said airfoil into leading and trailing portions, internal chordwise and sectional spanwise elements, sectional skin covering attached to said sectional elements, and an elastic unit disposed chordwise of the surface resiliently attaching abutting edges of said skin covering and said spanwise elements of said trailing portion, the said unit comprising spaced sheet-like elements having oppositely extending attachment portions and a rubber-like strip bonded to adjacent portions of said sheet-like elements.

3. In a joint for stressed-skin aircraft construction, the combination with a flat rubber strip and adjacently bonded metallic attachment sheets having oppositely extending portions each offset toward the plane passing through the center of said strip and parallel to its bonded surfaces and means for attaching said portions to the abutting edges of said stressed skin.

4. In aircraft construction, a resilient attachment unit for connecting adjacent stressed skin panels comprising spaced metallic sheets having oppositely extending attachment portions, and a rubber-like strip bonded to adjacent portions of said elements, the said attachment portions being inwardly offset such that they lie in substantially the same plane.

5. In aircraft construction, a movable surface comprising transverse formers, longitudinal elements attached to said fomers, stressed-skin covering attached externally to said formers and longitudinal elements, portions of said stressed-skin covering and certain of said longitudinal elements being interrupted along a transverse plane intermediate said formers in the trailing portion of said surface and resilient means attaching the abutting interrupted edges of said stressed-skin and longitudinal elements.

6. In an aircraft flap of stressed-skin construction, a longitudinal spar, transverse ribs attached to said spar, longitudinal elements attached to said ribs, skin covering attached externally to said ribs and longitudinal elements, the said skin and certain of said longitudinal elements being interrupted along a transverse plane rearward of said spar and intermediate said ribs, and resilient means attaching the said interrupted elements adapted to permit relative movement of one longitudinally disposed flap portion with respect to another.

7. In aircraft, a stressed-skin flap construction comprising a longitudinal spar, transverse ribs attached to said spar, longitudinal elements attached to said ribs, skin covering attached externally to said ribs and longitudinal elements, the said skin and longitudinal elements disposed aft of said spar being interrupted along a transverse plane intermediate and parallel to two of said ribs, and elastic units lying substantially in the plane of said skin covering attaching the said interrupted skin and elements adapted to resiliently permit relative movement of one portion of said flap with respect to an adjacent longitudinally disposed portion.

8. A movable aircraft surface of metal monocoque construction including, in combination, a spar dividing said airfoil into nose and trailing portions, chordwise rib elements, interrupted spanwise stiffener elements, an interrupted external skin covering attached to each said elements and chordwise extending strips of rubber-like material bonded to abutting interrupted edges of said elements in said trailing portion and adapted to permit relative movement between said adjacent and abutting trailing portions of said surface.

9. In aircraft construction, a cantilever wing subject to longitudinal deflection, and a movable airfoil of stressed-skin construction pivotally mounted upon said wing for movement relative thereto, the said airfoil comprising a longitudinal spar, transverse ribs attached to said spar, longitudinal elements attached to said ribs, hinge mounting elements disposed in the leading portion forward of said spar, the said skin and certain of said longitudinal elements being transversely interrupted rearward of said spar and intermediate said ribs, and resilient means, attaching both the said interrupted skin and elements, adapted to permit flexibility of said airfoil construction and prevent binding of said hinge mountings upon deflection of said wing.

GARLAND P. PEED, Jr.